Figure 1:
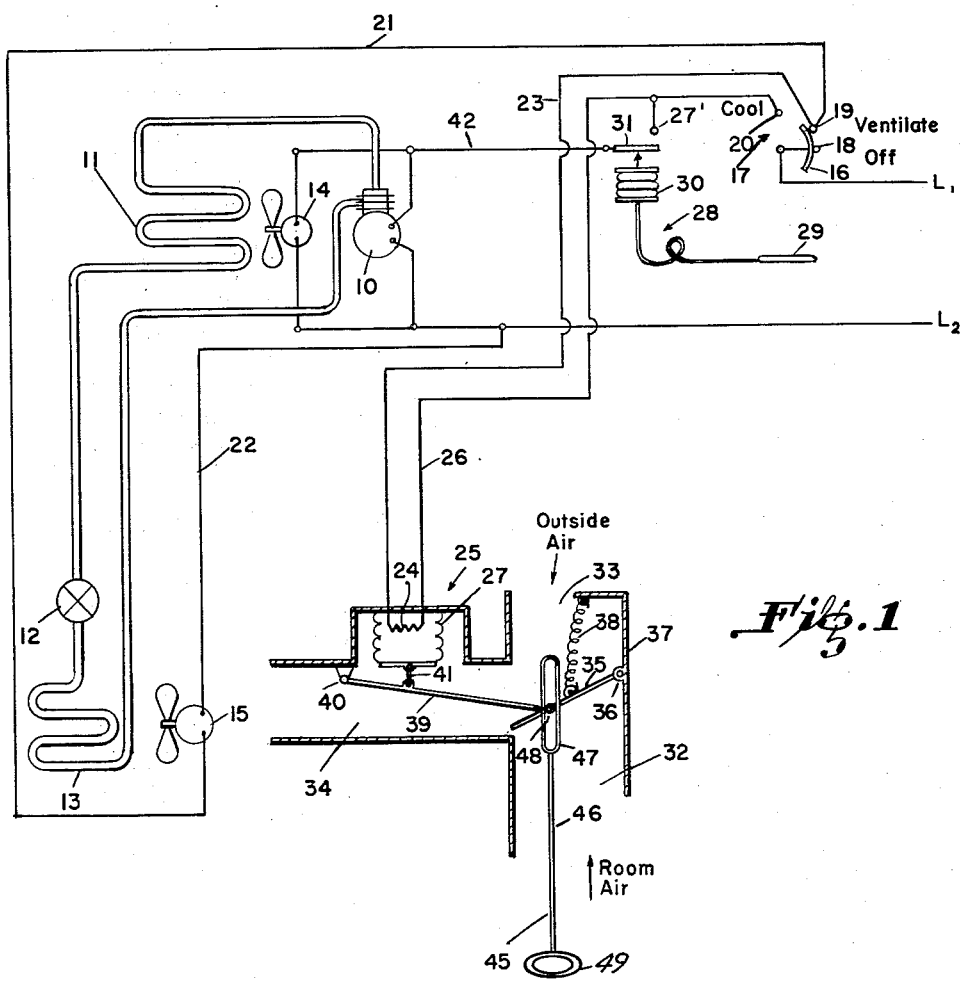

Sept. 20, 1960 W. L. McGRATH 2,952,990
AIR CONDITIONER CONTROL

Filed April 2, 1957

INVENTOR.
WILLIAM L. McGRATH.
BY Herman Seid
ATTORNEY.

United States Patent Office 2,952,990
Patented Sept. 20, 1960

2,952,990

AIR CONDITIONER CONTROL

William L. McGrath, Syracuse, N.Y., assignor to Carrier Corporation, Syracuse, N.Y., a corporation of Delaware Filed Apr. 2, 1957, Ser. No. 650,143

6 Claims. (Cl. 62—163)

This invention relates to air conditioning and more particularly to a simplified control arrangement for utilizing an air conditioner to ventilate or economically cool an enclosure subject to high heat loads during cool seasons of the year without utilizing the refrigeration circuit of the air conditioner.

In ordinary practice, during the cool seasons of the year an air conditioner is usually not operated at all. However, there are enclosures which are subject to intermittent high internal heat loads, thus making it desirable to have intermittent cooling even at low outside temperatures. However, to actually use the refrigeration circuit of an air conditioner to obtain desired cooling under the foregoing circumstances would be an economic waste since the cool outside air could serve the same purpose. It is economically desirable from the cost of equipment and cost of operation standpoint to utilize a modified air conditioning structure which will provide room cooling by the use of cool outside air during cool seasons of the year, as required, in addition to cooling air during the hot seasons in the conventional manner.

It is therefore the chief object of this invention to provide a simple, inexpensive, and efficient air conditioner construction which can selectively and automatically provide cooling in cool weather to an enclosure which is subject to intermittent high internal loads, as required, by blowing cool outside air into an enclosure.

It is another object of this invention to provide a novel and inexpensive control arrangement for an air conditioner which will permit it to operate in its conventional manner during the summer months, but will automatically and selectively provide cool air, as required, to an enclosure subject to high internal loads during the cool months of the year without utilizing the refrigeration circuit of the air conditioner.

It is still a further object of this invention to provide an air conditioner which will circulate the air within an enclosure during the heating season so as to permit maximum utilization of heating capacity and yet, when the temperature exceeds a predetermined value due to the presence of a high internal heat load will automatically pump cool outside air into the enclosure for cooling and ventilation. Other objects and attendant advantages of the present invention will readily appear hereafter.

The present invention relates to an air conditioner having means therein for selectively causing circulation of air within an enclosure or for causing outside air to be propelled into the enclosure. A thermostat, which is located in the enclosure to be conditioned, is provided for regulating the operation of the air conditioner. A switch having summer and winter positions governs the mode of operation of the air conditioner. In the winter position the refrigeration circuit of the air conditioner is inoperative and air from the enclosure is merely circulated by the air conditioner or cool outside air is pumped into the enclosure depending on the temperature of the enclosure as sensed by the thermostat. In the summer position of the switch the refrigeration circuit may be operative to cool the enclosure or may be dormant as determined by the thermostat. Thus the same thermostat governs operation of the air conditioner during all seasons of the year it being merely necessary to set the switch to its summer or winter operating position. The present invention will be more fully understood when the following portions of the specification are read in conjunction with the accompanying drawing.

Figure 2:
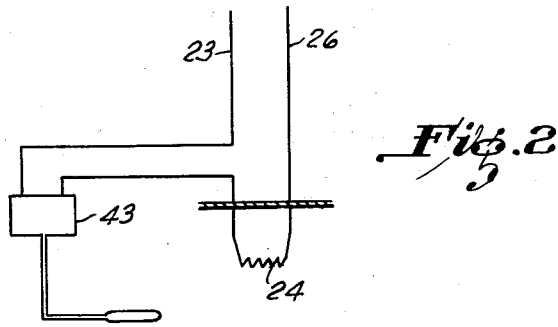

The attached drawing illustrates a preferred embodiment of the invention, in which Figure 1 is a schematic view of the refrigeration circuit; and Figure 2 is a fragmentary view of a portion of the electrical circuit including a modified control.

Referring to the drawing, there is shown a compressor 10, condenser 11, expansion member 12, and evaporator 13 suitably interconnected by refrigerant carrying conduits (not numbered) in the conventional manner. A condenser fan 14 is provided for blowing air over condenser 11 as is well known in the art. An evaporator fan 15 is also provided for the dual purpose of blowing air to be cooled over the evaporator 13 when the air conditioner is used under summer operating conditions and for causing circulation of air in or blowing cool air into an enclosure during winter operating conditions. It will, of course, be appreciated that conventional structural characteristics of an air conditioner have been omitted from the drawings for the sake of clarity.

Electrical lead lines $L_1$ and $L_2$ are provided from a suitable source of electric current, not shown. Lead $L_1$ is coupled to armature 16 of three-position switch 17, which has off-terminal 18, winter ventilation terminal 19 and summer cooling terminal 20 therein. When armature 16 contacts only terminal 18, the air conditioner is not in operation. When armature 16 is placed in contact with terminal 19, the air conditioner is set for winter operation in that the circuit is completed from $L_1$ through switch 17, lead 21 and lead 22 to line $L_2$ to complete a circuit through evaporator fan motor 15. Terminal 19 is also connected by lead 23 to resistance element 24 of heat motor 25. The other end of high resistance heater 24 is connected via lead 26 to terminal 27' for a purpose to be explained hereafter.

The heat motor 25, which is conventional, in addition to containing high resistance element 24, consists of a bellows 27 which contains a volatile fluid which will expand when resistance 24 is energized thus causing bellows 27 to be in an expanded condition. If heater element 24 is not energized, bellows 27 will be in a contracted position.

A thermostat 28 is provided with bulb 29 being positioned in the enclosure to be conditioned. As bulb 29 senses changes in temperature, bellows 30 will expand or contract accordingly. An armature 31 is motivated by bellows 30 so that it will contact terminal 27' when the temperature of the enclosure rises above a predetermined value.

An air passage arrangement is provided in the air conditioner as follows: A first passage 32 leads from the enclosure to be conditioned. A second passage 33 leads from an area external to the exclosure being conditioned, such as the out-of-doors. A third passage 34 is selectively communicable with either of the foregoing two passages to lead air from either of the foregoing two passages into the enclosure to be conditioned. A damper 35 is suitably hinged as at 36 to the common wall 37 of passages 32 and 33. Damper 35 is normally biased by spring 38 so that it closes off passage 33 from passage 34, or in other words causes communication between passages 32 and 34. A lever 39 is pivoted at one end as at 40 to the wall of passage 34 and is connected intermediate its ends by a suitable linkage 41 to bellows 27 of heat motor 25. The end of lever 39 which is remote from pivot point 40 is adapted to rest against damper 35 so as to move damper 35 in response to the expansion of bellows 27 of heat motor 25. When bellows 27 is in its extended condition, passages 33 and 34 are in communication with each other, as shown in the drawing.

Under cool weather operating conditions armature 16 of switch 17 is in a position shown in the drawing and the air conditioner operates in the following manner: Current is supplied through switch 17 via leads 21 and 22 to evaporator fan motor 15, which is thus in constant operation. When thermostat bulb 29 senses a predetermined high temperature in the enclosure to be conditioned, bellows 30 will expand and cause armature 31 to contact terminal 27' to complete a circuit from terminal 19 through lead 23 to high resistance 24 of heat motor 25, the remainder of the circuit being through lead 26, terminal 27', armature 31, lead 42 and then across the compressor motor 10 and condenser fan motor 14 to lead $L_2$. It is to be noted that compressor 10 and condenser fan 14 do not operate even though current is passing through them because high resistance 24 produces a sufficiently high voltage drop that insufficient voltage passes across the first two elements for their operation. When thermostat 28 causes the foregoing response, bellows 27 of heat motor 25 will expand so as to cause damper 35 to assume the position shown in the drawing and thus cause passages 33 and 34 to be put into communication with each other. As noted above, evaporator fan 15 is in constant operation. This fan will thus cause outside air to flow through passage 33 and into passage 34 from which it is discharged into the area to be conditioned to thus provide cooling to this enclosure by using cool outside air. It is to be further noted that when heat motor 25 is not energized, passages 32 and 34 are in comunication while evaporator fan 15 is in operation. This latter operation causes a constant circulation of air within the enclosure to be conditioned, resulting in the efficient distribution of the warm air therein.

When it is desired to operate the air conditioner under summer operating conditions, that is, utilize the refrigeration circuit, it is only necessary to move armature 16 of switch 17 so that it straddles both contacts 19 and 20. When an enclosure requires cooling, thermostat 28 will cause armature 31 to come into contact with terminal 27'. Thus a circuit will be completed through the compressor 10, condenser fan 14, and evaporator fan 15 to cause the unit to operate in its conventional manner. However, it can readily be seen that since armature 16 is across terminals 19 and 20, the armature serves as a shunt for high resistance element 24 of heat motor 25, thus preventing the latter from being energized. Consequently, bellows 27 will be in its contracted position and tension spring 38 will cause damper 35 to allow communication between air passages 32 and 34, so that the circulation caused by the air conditioner will be of air which is within the enclosure to be conditioned and no outside air will be brought into this enclosure.

It can readily be appreciated that under very cold weather operating conditions the pumping of air which is too cool into a room might be objectionable. When this may occur, the following structure may be utilized: A thermostatic switch 43 may be placed in series with line 23 leading to high resistance element 24. The bulb of the thermostatic switch 43 is positioned in the passage 34. When the temperature of the outside air passing through passage 34 reaches a predetermined minimum value say 50° F., switch 43 will break the circuit to high resistance element 24 so as to deenergize heat motor 25 until such time that the temperature in duct 34 rises sufficiently to again energize heat motor 25 to move damper 35 to cause outside air to pass into the enclosure to be conditioned. This will cycle motor 25 to hold the discharge temperature relatively constant at say 50°.

Another modification which may be incorporated into the present invention is that a manual damper operator 45 may be suitably atached to damper 35. Operator 45 will permit the overriding of the heat motor 25 to permit the opening of damper 35 in the event that it is desired to obtain fresh outside air even though thermostat 28 indicates that none is required. Conversely, operator 45 may also be used to prevent the entry of any outside air, even though thermostat 28 indicates that some is required. Operator 45 consists of a stem 46 having handle 49 affixed to one end thereof. The other end mounts a slotted member 47. Pin 48, which is mounted on damper 35, fits in the slot of member 47. When pin 48 is in the central portion of the slot, damper motor 25 can control the position of damper 35 because pin 48 can move freely in the slot. However, if it is desired to prevent communication between passages 33 and 34, operator 45 is moved until the lower portion of the slotted member 47 abuts pin 48. Continued movement will then cause damper 35 to close passage 33. Conversely, to close passage 32, operator 45 is moved downwardly until the top of member 47 abuts pin 48. Continued movement will force damper 35 downwardly until passage 32 is closed. It will be readily appreciated that suitable means (not shown) may be provided for locking operator 45 in any desired position.

It can thus be seen that I have provided a simple, efficient and economical construction utilizing a minimum of parts which will permit an air conditioner to provide desired temperature to an enclosure during all seasons of the year. It is to be especially noted that the same thermostat is used for both hot and cold weather operation.

Having thus described preferred embodiments of my invention, I desire it to be understood that it is not to be limited thereto but that it may be otherwise embodied within the scope of the following claims.

I claim:

1. In an air conditioner, the combination of a first passage leading to an enclosure, a second passage leading from said enclosure, a third passage communicating with an area external to said enclosure, a damper mechanism for selectively placing said first and second passages in communication and placing said first and third passages in communication, an electrical circuit including a switch having winter and summer positions, first means in said circuit to open and to close the circuit, said means being responsive to the temperature of said enclosure and operatively associated with said switch, second means in said circuit responsive to actuation of said first means for actuating the damper mechanism whereby when the switch is in winter position said first means in response to a predetermined temperature in the enclosure energizes said second means to place the damper mechanism in a position whereby the first and third passages are in communication while when the switch is in winter position and the temperature in the enclosure is below the predetermined temperature the damper mechanism is actuated to place the first and second passages in communication, the first and second passages being in communication when the switch is in summer position.

2. An air conditioner according to claim 1 further comprising a refrigeration system whereby when said switch is in summer position said refrigeration system is responsive to said first means.

3. An air conditioning system according to claim 2 further comprising manual means for positioning said damper and over-riding said first means.

4. An air conditioning system according to claim 1 further comprising means biasing the damper mechanism in a position placing the first and second passages in communication, said second means including a motor means associated with the damper mechanism whereby the first means in response to a temperature above the predetermined temperature causes said motor means to overcome the means biasing the damper mechanism placing the first and third passages in communication.

5. In an air conditioner, the combination of a first passage leading to an enclosure, a second passage leading from said enclosure, a third passage communicating with an area external to said enclosure, a damper mechanism for selectively placing said first and second passages in communication and placing said first and third passages in communication, a switch having winter and summer positions, first means responsive to the temperature of said enclosure operatively associated with said switch, second means responsive to said first means for actuating the damper mechanism whereby when the switch is in winter position said first means in response to a predetermined temperature in the enclosure actuates said second means to place the damper mechanism in a position whereby the first and third passages are in communication while, when the switch is in winter position and the temperature in the enclosure is below the predetermined temperature, the damper mechanism is actuated to place the first and second passages in communication, the first and second passages being in communication when the switch is in summer position, and means biasing the damper mechanism in a position placing the first and second passages in communication, said second means including a heat motor operatively associated with the damper mechanism, said heat motor having an electrical heating element located in an electrical circuit including the first means, said electrical circuit being closed by the first means in response to said predetermined temperature causing the heat motor to overcome the means biasing the damper mechanism thereby placing the first and third passages in communication.

6. An air conditioner according to claim 5 in which said heat motor includes said heating element, a fluid filled bellows and means connecting the bellows to the damper mechanism.

References Cited in the file of this patent
UNITED STATES PATENTS

| | | |
|---|---|---|
| 2,216,475 | Metcalf | Oct. 1, 1940 |
| 2,219,861 | Anderson | Oct. 29, 1940 |
| 2,319,905 | Palmer | May 25, 1943 |
| 2,327,664 | Otis | Aug. 24, 1943 |
| 2,332,730 | Kucher | Oct. 26, 1943 |
| 2,342,841 | Carraway | Feb. 29, 1944 |
| 2,726,067 | Wetherbee et al. | Dec. 6, 1955 |